United States Patent [19]

Shimura

[11] Patent Number: 5,758,041
[45] Date of Patent: May 26, 1998

[54] OUTPUT CONTROL METHOD AND APPARATUS

[75] Inventor: Akihiro Shimura, Tokyo, Japan

[73] Assignee: Canon Kabushiki Kaisha, Tokyo, Japan

[21] Appl. No.: 735,818

[22] Filed: Oct. 23, 1996

Related U.S. Application Data

[63] Continuation of Ser. No. 79,562, Jun. 22, 1993, abandoned.

[30] Foreign Application Priority Data

Jun. 23, 1992 [JP] Japan ................... 4-164585

[51] Int. Cl.⁶ .................................. G06K 15/00
[52] U.S. Cl. ................. 395/113; 395/110; 395/114
[58] Field of Search .................. 395/114, 112, 395/113, 286, 110, 117, 101, 115, 116, 102; 364/479.07, 479.05; 358/404, 407, 444, 406, 401, 434, 435, 436, 437, 438, 439, 468, 405; 399/12, 8, 9; 347/19, 142

[56] References Cited

U.S. PATENT DOCUMENTS

| | | | |
|---|---|---|---|
| 4,870,596 | 9/1989 | Smith | 364/479 |
| 5,247,623 | 9/1993 | Sun | 395/325 |

FOREIGN PATENT DOCUMENTS 0477039  3/1992  European Pat. Off.

OTHER PUBLICATIONS

IBM Technical Disclosure Bulletin, vol. 33, No. 5, Oct. 1, 1990, pp. 30–32, XP000107364 "Dynamic Printer Definition".

*Primary Examiner*—Edward L. Coles, Sr.
*Assistant Examiner*—Dov Popovici
*Attorney, Agent, or Firm*—Fitzpatrick, Cella, Harper & Scinto

[57] ABSTRACT

An output control method and apparatus for receiving data from an external apparatus such as a floppy disc and generating are disclosed. ID data that is peculiar to a printer is non-volatilely stored in advance into a writable/readable non-volatile secondary memory device such as a hard disc or the like. An ID number sent from an external apparatus such as a host computer is compared with the stored ID number. When the ID numbers don't coincide, data reception from the external apparatus is inhibited. When they coincide, the data from the external apparatus is received and stored into the secondary memory device. The data from the external apparatus is printed with reference to the data stored in the secondary memory device.

9 Claims, 6 Drawing Sheets

OUTPUT CONTROL METHOD AND APPARATUS

This application is a continuation of application Ser. No. 08/079,562, filed Jun. 22, 1993, now abandoned.

BACKGROUND OF THE INVENTION

1. Field of the Invention

The present invention relates to an output control method and apparatus for receiving data from an external apparatus and for outputting.

2. Related Background Art

Hitherto, in a printer having a writable/readable non-volatile secondary memory device such as a hard disc or the like, there is a printer such that fonts which are used to print are downloaded, or a table such as type styles or character codes or the like is downloaded, from an apparatus such as a host computer or the like which is connected to such a printer and provides print information, and print data can then be printed in the mode suitable for a particular output request of the host computer.

In such a printer as mentioned above, data which is registered into a writable/readable non-volatile secondary memory means such as a hard disc or the like is merely registered in accordance with a registration command and with registration data which are sent from the host computer through a communication path.

In the conventional apparatus as mentioned above, since data is merely registered on the basis of the registration command from the host computer, the data can be unconditionally downloaded to any printer, so that there is a fear that data may be illegally copied. There is, consequently, a problem that, even in the case of printed matter which onerously uses certain fonts, by downloading such fonts to a printer, document data or the like using such fonts can be easily copied.

SUMMARY OF THE INVENTION

The invention is made in consideration of the above problems in conventional printers, and it is an object of the invention to provide an output control method and apparatus which can onerously transmit and store data to a special printer only.

One aspect of the invention is to provide an output control method and apparatus in which ID data of a printer is non-volatilely stored, an ID number which is sent from an external apparatus is compared with the stored ID number and when they are shown by the result of the comparison to differ, the data reception from the external apparatus is inhibited, and when they coincide, the data from the external apparatus is received and stored.

Another aspect of the invention is to provide an output control method and apparatus in which are performed the steps of: non-volatilely storing ID data of a printer, comparing an ID number sent from an external apparatus and the stored ID number, and inhibiting data reception from the external apparatus when those numbers are shown to differ by the comparison; receiving data from the external apparatus and storing it into a secondary memory device when those numbers coincide; and printing the data from the external apparatus with reference to the data stored in the secondary memory device.

DETAILED DESCRIPTION OF THE PREFERRED EMBODIMENTS

An embodiment of the present invention will now be described in detail hereinbelow with reference to the drawings.

Figure 1:
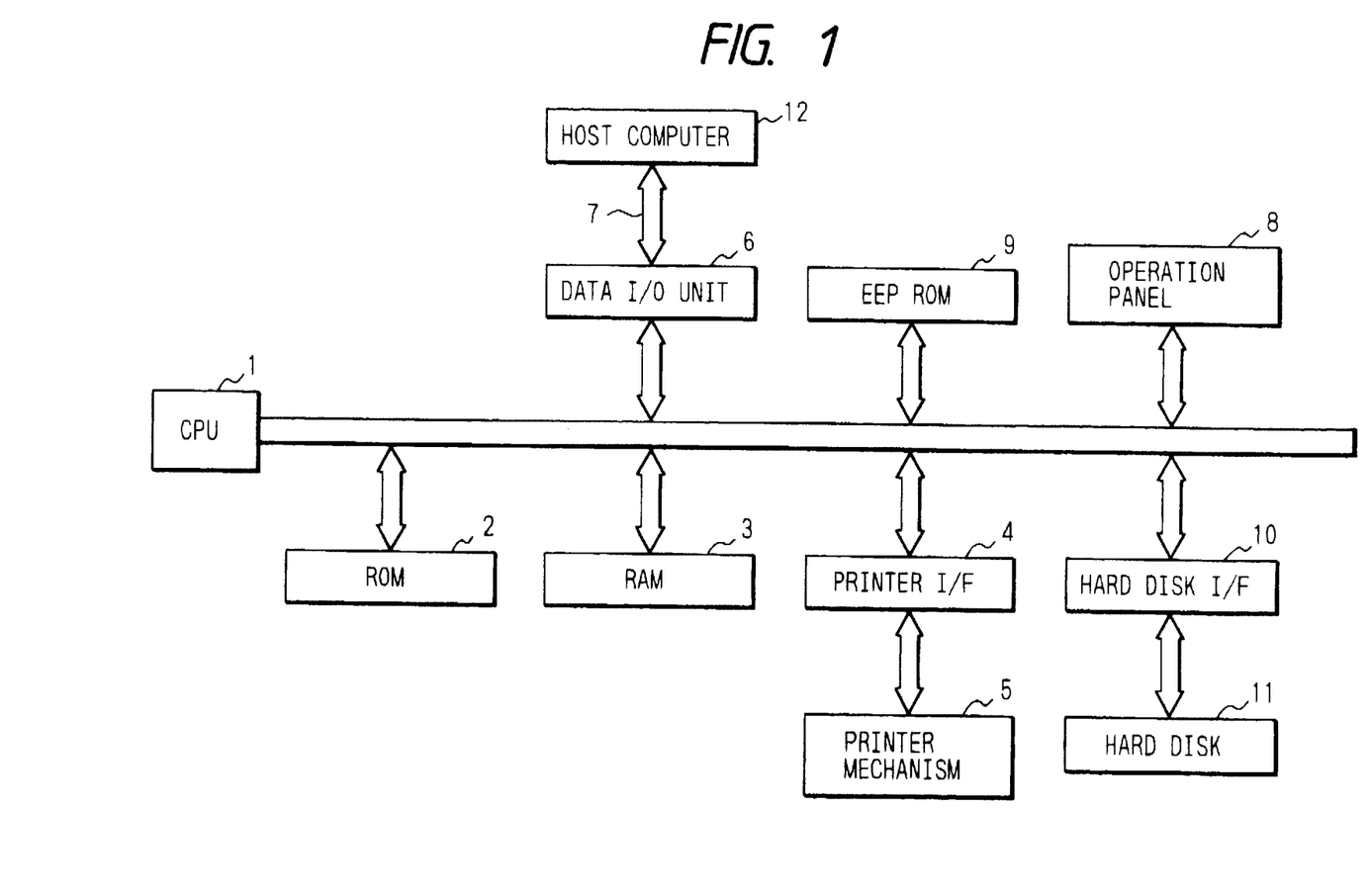
FIG. 1 is a block diagram showing a schematic construction of a printer of an embodiment of the present invention.

FIG. 1 is a block diagram showing a schematic construction of a printer according to one preferred embodiment.

In FIG. 1, reference numeral 1 denotes a CPU to control the whole printer, and 2 indicates an ROM in which programs by which the CPU 1 operates, data, and the like have been stored. The memory shown here as ROM 2 is not necessarily limited to a ROM but can also be any other memory having a function to store programs, data, and the like. Reference numeral 3 denotes a RAM which is used as a work area or the like to temporarily store data or the like; 4 a printer interface to control the interface with a printer mechanism 5; and 5 the printer mechanism having a construction, for example, as shown in detail in FIG. 2. The printer mechanism 5 is a portion such as a wire-dot printer, thermal copy transfer printer, is laser beam printer, or the like and serves to print a dot image onto paper. The printer interface 4 is a portion for converting a bit image drawn in the RAM 3 by the CPU 1 into a dot image in a form adapted to the mechanism of the printer mechanism 5. For example, the printer interface 4 executes a process to convert parallel data into serial data or the like.

Reference numeral 6 denotes a data input/output unit for inputting or outputting data to/from a host computer 12; 7 a communication path to transmit the input data or the like which is transmitted between the data I/O unit 6 and the host computer 12; 8 an operation panel to display or input various kinds of information; and 9 an EEPROM in which ID data and the like of the printer has been stored. The memory shown here as EEPROM 9 is not necessarily limited to an EEPROM but can be any other non-volatile memory device. Reference numeral 11 denotes a hard disc to store various kinds of data which is downloaded from the host computer 12. The CPU 1 executes the reading operation, writing operation, and the like for the hard disc 11 through a hard disc interface 10. The element shown here as hard disc 11 is not necessarily limited to a hard disc but can also be any other writable/readable non-volatile secondary memory device. In this case, the hard disc interface 10, in order to be adapted to the particular form of the writable/readable non-volatile secondary memory device, is also constructed as an interface unit corresponding thereto.

Figure 2:
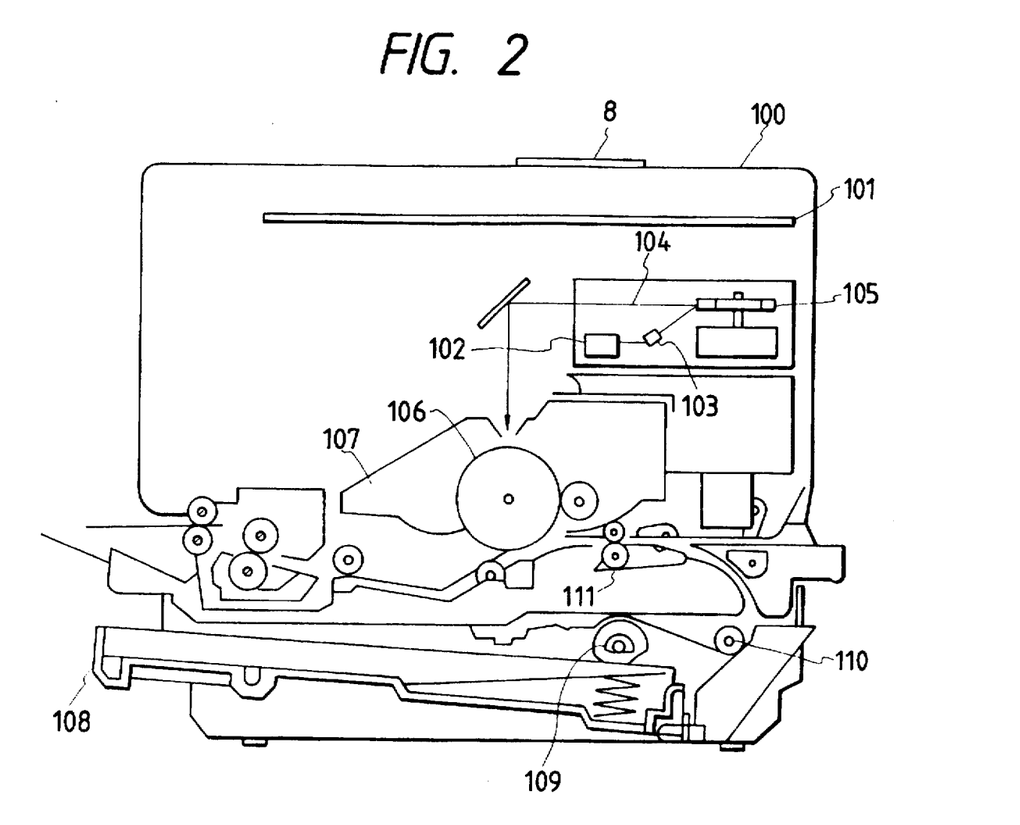
FIG. 2 is a cross-sectional diagram showing a structure of a laser beam printer according to that embodiment.

FIG. 2 is a cross-sectional view showing an internal structure of a laser beam printer (LBP) 100 according to one preferred embodiment. The LBP 100 is constructed so that it can register character patterns from a data source (host computer 12 or the like), fixed format (form data), and the like.

In FIG. 2, the LBP main body 100 receives and stores character information (character codes), form information and macro instruction or the like which are supplied from the host computer or the like connected to the outside. The LBP 100 makes the corresponding character pattern, form pattern, and the like in accordance with that information and forms an image on recording paper as a recording medium. Reference numeral 8 denotes the operation panel on which various kinds of switches for operation, an LED display, and the like are arranged. Reference numeral 101 denotes a printer control unit for controlling the whole LBP 100 and for analyzing the character information or the like which is supplied from the host computer. The printer control unit 101 mainly converts character information into a video signal of the corresponding character pattern and supplies the signal to a laser driver 102. The laser driver 102 is a circuit to drive a semiconductor laser 103 and for on/off switching the semiconductor laser in accordance with the inputted video signal. A laser beam 104 emitted from the semiconductor laser 103 is swung to the right and left by a rotary polygonal mirror 105 and scans an electrostatic drum 106, so that an electrostatic latent image of a character pattern is formed on the drum 106. The latent image is developed by a developing unit 107 arranged around the drum 106 and is copy transferred onto a recording paper after that. Cut sheets are used as recording paper. The cut recording sheets are enclosed in a paper cassette 108 attached in the LBP main body 100 and are picked up and conveyed one by one into the LBP main body by a feed roller 109 and conveying rollers 110 and 111 and supplied to the drum 106.

Figure 3:
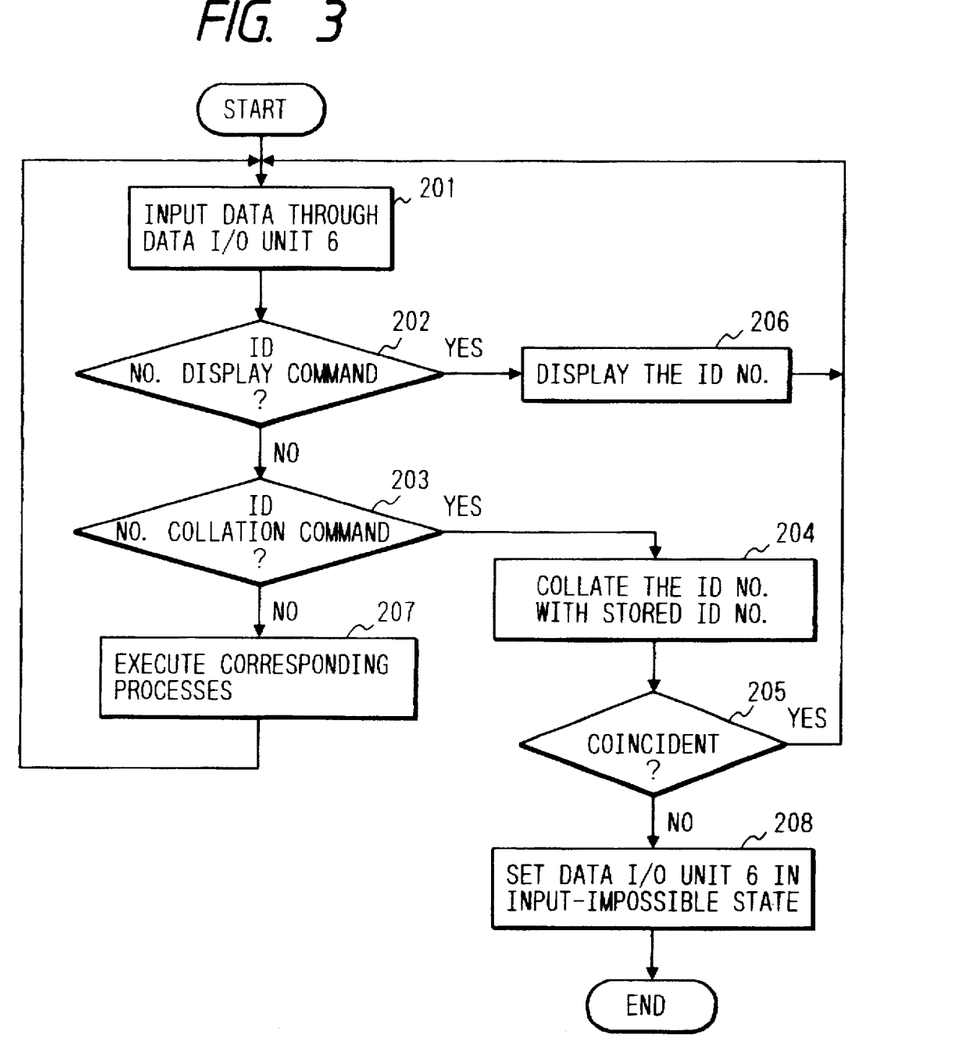
FIG. 3 is a flowchart showing processes in a stationary state of the printer according to that embodiment.

FIG. 3 is a flowchart showing processes in a stationary state of the printer of this embodiment.

Figure 4:
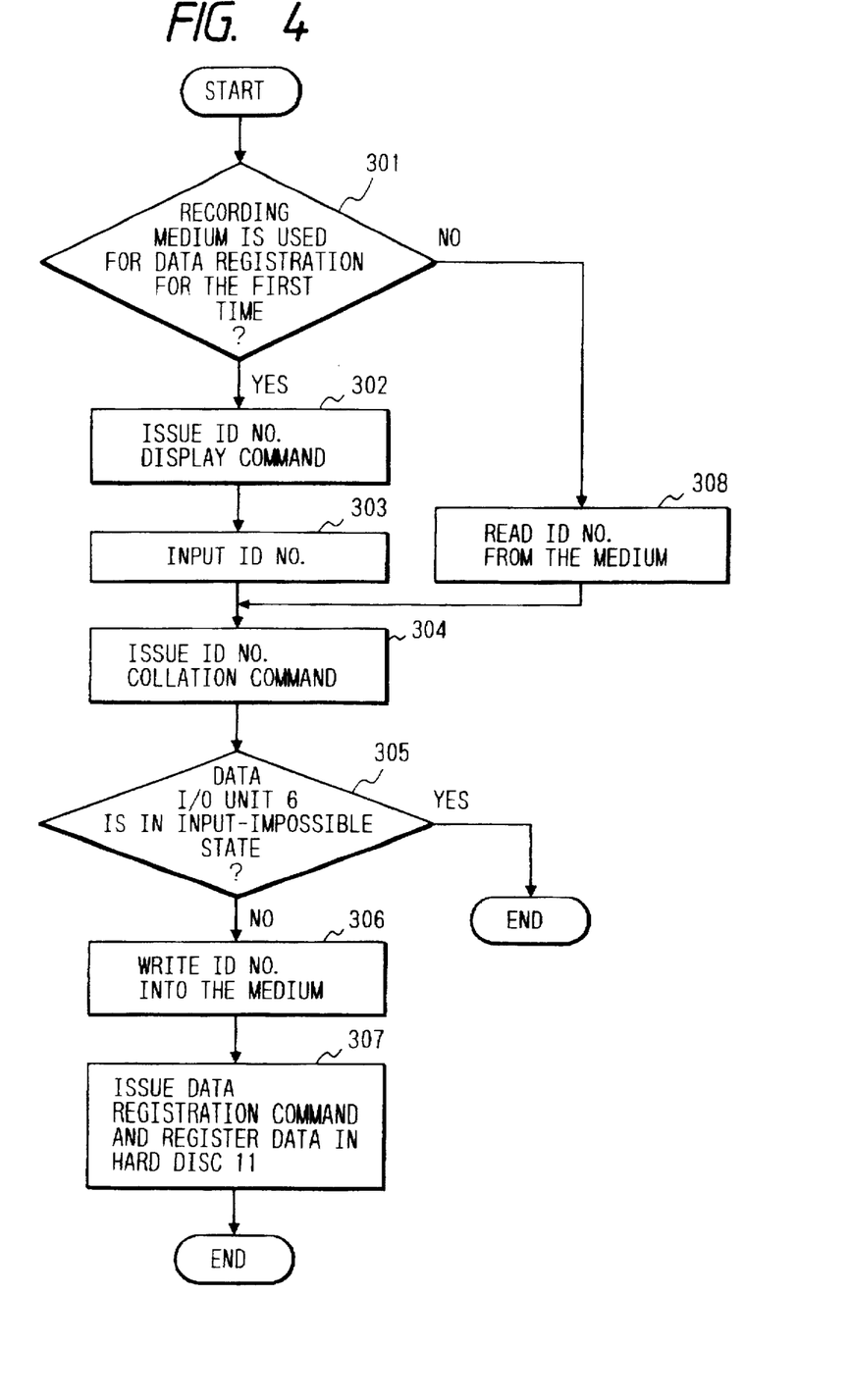
FIG. 4 is a flowchart showing processes in the case where a host computer registers data into a hard disc of the printer according to that embodiment.

FIG. 4 is a flowchart showing processes for the host computer 12 to register data or the like into the hard disc of the printer in this embodiment.

First, an outline of the operation of a whole system including the host computer 12 when the present printer is used will be first described with reference to the flowchart of FIG. 4 with respect to the processes of the host computer 12 in the case where the host computer 12 registers data into the hard disc 11.

First, in step S301, a check is made to see if a supply medium such as a floppy disk or the like in which registration data has been stored is used for data registration (downloading) for the first time or not. In the above discrimination, the data is first read out from the supply medium. When the data is registered to the hard disc 11 of the printer, judgment data indicating that the supply medium has been used for data registration is previously written into the supply medium such as a floppy disk. The judgment in step S301 is performed on the basis of such judgment data. If YES in step S301, step S302 follows, and an ID number display command to display the ID number of the printer is issued to the printer.

The printer displays the ID number that is peculiar to the printer on the operation panel 8 in accordance with the ID number display command. The processing routine advances to step S303 and the operator enters the ID number displayed on the operation panel 8 using an input device such as a keyboard or the like connected to the host computer 12. In step S304, an ID number collation (or comparison) command is issued to the printer of the embodiment together with the ID number inputted in step S303. In this instance, when the result of the collation (comparison) indicates that the ID numbers don't coincide, the printer sets the data I/O unit 6 into an input-impossible state and stops the processing.

In step S305, a check is made to see if the data I/O unit 6 is in the input-impossible state or not. If YES, the processing is stopped. If NO, step S306 follows and the ID number of the printer which was inputted in step S303 is written into the registration data supply medium such as a floppy disc or the like. In step S307, the data in the supply medium such as a floppy disk or the like is registered into the hard disc 11 by a registration command.

If NO in step S301, step S308 follows, and the ID number of the apparatus written in step S306 at the first time is read out from the supply medium such as a floppy disk. The processes in step S304 and subsequent steps are similarly executed by using the read-out ID number of the printer.

According to the above embodiment, the data can be registered into a non-volatile secondary memory device of a single printer from the registration data supply medium such as a floppy disk connected to the host computer.

The embodiment has been described with respect to the case of the system such that the registration data which is supplied from the host computer 12 connected to the printer and is downloaded into the hard disc of the printer is supplied from the floppy disk, and the reading operation of the data from the floppy disk is executed by the host computer 12. The registration data supply medium is not limited to a floppy disk. For example, a similar effect is also obtained even by using another memory device such as a memory card, CDROM, or the like.

Processes in a stationary state of the printer of this embodiment will now be described with reference to the flowchart of FIG. 3.

Prior to executing the processes, the ID number of the printer is stored into the EEPROM 9. It is sufficient to register the printer ID number into the EEPROM 9 only once. In step S201, the input data from the host computer 12 is received through the data I/O unit 6. In step S202, a check is made to see if the input data indicates the ID number display command or not. If YES, the ID number that is peculiar to the printer and has been stored in the EEPROM 9 is read out and displayed on the operation panel 8. The processing routine is returned to step S201.

On the other hand, if NO in step S202, step S203 follows, and a check is made to see if the input data indicates the ID number collation command or not. If NO, step S207 follows and the ordinary processes are executed. The processing routine is returned to step S201.

If YES in step S203, step S204 follows, and the ID number which is sent from the host computer 12 together with the ID number collation command is collated with the ID number stored in the EEPROM 9. In the next step S205, when the result of the collation in step S204 indicates that the ID numbers coincide, the processing routine is returned to step S201 and the processes are executed. If NO in step S205, the data I/O unit 6 is set into the input-impossible state, and the processes are stopped.

The structure is not limited to that of the above embodiment, but many modifications and variations are possible within the purview of the spirit of the present invention.

For example, in the above embodiment, in place of the EEPROM 9 to store the ID number, the printer ID number can be also stored into the hard disc 11. In this case, the processes are executed in a manner similar to the above except that in the apparatus of the embodiment, the ID number is read out from the hard disc 11 in the processes of the ID number display command and ID number collation command. Even by such a structure, data can be registered into only a writable/readable non-volatile secondary memory device of only one printer for only a single registration data supply medium such as a floppy disk or the like.

Although the invention has been described with respect to the laser beam printer as an example of the image forming apparatus of the embodiment, the invention is not limited to such a printer but can be also similarly applied to an ink jet printer or the like which will be explained herein below.

Figure 5:
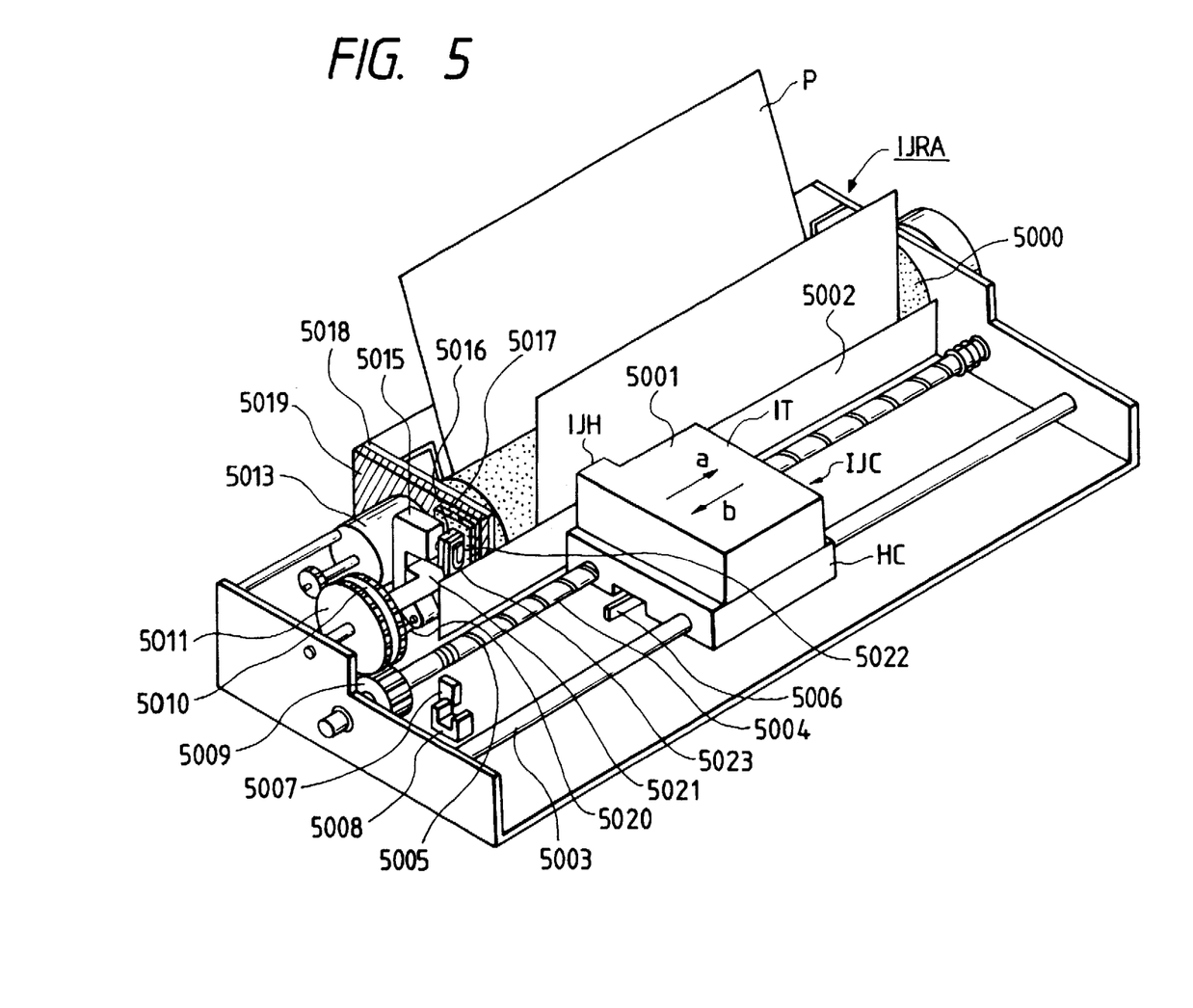
FIG. 5 is a schematic diagram showing an ink jet recording apparatus according to another embodiment to which the invention can be applied.

FIG. 5 is a schematic diagram of an ink jet recording apparatus IJRA to which the invention can be applied. In the diagram, a lead screw 5005 is rotated in association with the forward/reverse rotation of a driving motor 5013 through driving force transfer gears 5011 and 5009. A carriage HC has a pin (not shown) which is adapted to be come into engagement with a spiral groove 5004 of the lead screw 5005. The carriage HC is reciprocated in the directions indicated by arrows a and b in the diagram. An ink jet cartridge IJC is mounted on the carriage HC. Reference numeral 5002 denotes a paper pressing plate for pressing recording paper onto a platen 5000 in the moving direction of the carriage. Reference numerals 5007 and 5008 denote photocouplers as home position detecting means for checking the presence of a lever 5006 of the carriage in each area where the photocoupler is arranged and for executing the switching of the rotating direction of a motor 5013 or the like. Reference numeral 5016 denotes a member to support a cap member 5022 to cap the front surface of the recording head; 5015 sucking means for sucking the inside of the cap and for performing a sucking recovery of a recording head through an opening 5023 in the cap; 5017 a cleaning blade; and 5019 a member for enabling the cleaning blade to be moved in the front/back direction. The members 5017 and 5018 are supported to a main body supporting plate 5018. The cleaning blade is not limited to the shape shown in the diagram but any other well-known cleaning blade can be also obviously used.in the embodiment. Reference numeral 5012 denotes a lever to start the sucking operation in the sucking recovery. The lever 5012 is moved in association with the movement of a cam 5020 which is come into engagement with the carriage. A driving force from the driving motor is transferred and controlled by well-known transfer means such as clutch switching means or the like.

The desired one of the capping, cleaning, and sucking recovery processes can be executed at the corresponding position by the operation of the lead screw 5005 when the carriage arrives at the region on the home position side. So long as a desired one of those processes can be executed at a well-known timing, any of them can be also applied to the invention.

Figure 6:
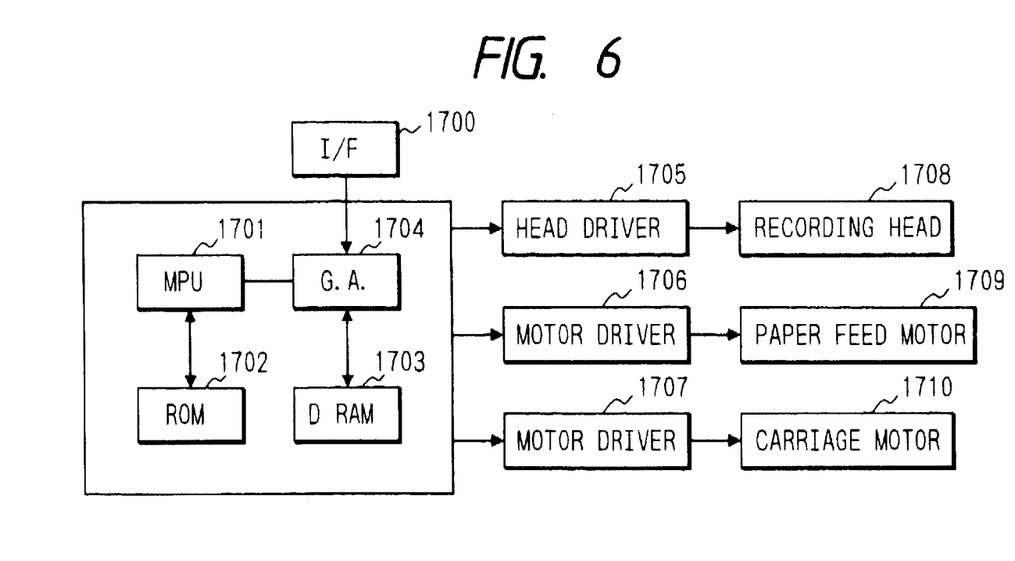
FIG. 6 is a block diagram showing a schematic control construction of the ink jet recording apparatus of FIG. 5.

A control construction to execute the recording control of the printer mentioned above will now be described with reference to a block diagram shown in FIG. 6. In the FIG. 6 showing a control circuit, reference numeral 1700 denotes an interface to input a recording signal. The interface 1700 corresponds to the foregoing data I/O unit 6. Reference numeral 1701 denotes an MPU; 1702 a program ROM to store control programs which are executed by the MPU 1701; and 1703 a dynamic RAM to preserve various kinds of data (the above, recording signal, recording data which is supplied to the head, etc.). Those component elements 1701, 1702, and 1703 correspond respectively to the CPU 1, ROM 2, and RAM 3 mentioned above in FIG. 1. Reference numeral 1704 denotes a gate array to supply and control recording data to a recording head 1708. The gate array 1704 also controls the data transfer among the interface 1700, MPU 1701, and RAM 1703. Reference numeral 1709 denotes a carriage motor to convey the recording head 1708; 1709 a paper feed motor to convey a recording paper; 1705 a head driver to drive the head; 1706 a motor driver to drive the paper conveying motor 1709; and 1707 a motor driver to drive a carriage motor 1710.

The operation of the above control construction will now be described. When a recording signal is supplied to the interface 1700, the recording signal is converted into the recording data for printing between the gate array 1704 and the MPU 1701. Both of the motor drivers 1706 and 1707 are driven. The recording head is driven in accordance with the recording data sent to the head driver 1705 and the printing operation is executed.

The component elements of the invention can be assembled to the control construction of the ink jet printer as mentioned above. The invention is not limited to the laser beam printer but can be also obviously applied to the above ink jet printer or the like.

The invention can be applied to a system comprising one or a plurality of apparatuses. The invention can be also obviously applied to the case where the invention is accomplished by supplying programs for executing the invention to a system or an apparatus.

According to the embodiment as described above, since the ID number that is peculiar to the printer can be managed by the host computer, it is possible to prevent the registration data supply medium being copied and used illegally. The invention is, therefore, also fairly useful from a viewpoint of copyright protection. There is also an effect that by allowing downloading only to a special apparatus, an erroneous operation in which the content of the secondary memory means of the printer is erroneously rewritten can also be prevented.

According to the invention as described above, since data can be transmitted and stored only in a special (particular) printer, there is an effect that it is possible to prevent the data being copied to other apparatuses.

As described above, according to the invention, it is possible to provide an output control method and apparatus in which data can be transmitted to and stored only in a special printer.

According to the invention as mentioned above, it is possible to provide an output control method and apparatus in which ID data of a printer is non-volatilely stored in advance, an ID number which is sent from an external apparatus is compared with the stored ID number, and when those ID numbers don't coincide, data reception from the external apparatus is inhibited, and when they do coincide, the data from the external apparatus is received and stored.

According to the invention as described above, it is possible to provide an output control method and apparatus in which ID data of a printer is non-volatilely stored in advance, an ID number which is sent from an external apparatus is compared with the stored ID number, and when those ID numbers don't coincide, data reception from the external apparatus is inhibited, and when they do coincide, the data from the external apparatus is received and stored into a secondary memory device, and the data from the external apparatus is printed with reference to the data stored in the secondary memory device.

What is claimed is:

1. An output control apparatus for controlling a printer having a data input section, the output control apparatus comprising:

nonvolatile memory means for storing identification data of the printer, the identification data being provided for determining whether registration data may be received from an external apparatus;

determining means for determining whether a collation command is received from the external apparatus;

collating means for receiving identification data from the external apparatus and collating the identification data stored in said memory means with the identification data received from the external apparatus in response to a determination by said determining means that the collation command is received from the external apparatus; and control means for disabling the data input section of the printer to disable the inputting of registration data from the external apparatus in response to a collation by said collating means that the two identification data differ from each other.

2. An apparatus according to claim 1, wherein the registration data comprises font data or form data.

3. An apparatus according to claim 1, wherein said determining means performs its determination to load the registration data from the external apparatus into a hard disc of the printer.

4. An output control method for controlling a printer having a data input section using a nonvolatile memory for storing identification data of the printer, the identification data being provided for determining whether registration data may be received from an external apparatus, the method comprising the steps of:

determining whether a collation command is received from the external apparatus;

receiving identification data from the external apparatus;

collating the stored identification data with the identification data received from the external apparatus in response to a determination in said determining step that the collation command is received from the external apparatus; and disabling the data input section of the printer to disable the inputting of registration data from the external apparatus in response to a collation in said collating step that the two identification data differ from each other.

5. A method according to claim 4, wherein the registration data comprises font data or form data.

6. A method according to claim 4, wherein said determining step is performed in order to load the registration data from the external apparatus into a hard disc of the printer.

7. A computer readable storage medium for use in an output control apparatus for controlling a printer having a data input section using a nonvolatile memory for storing identification data of the printer, the identification data being provided for determining whether registration data may be received from an external apparatus, said storage medium storing a program to cause the output control apparatus to perform at least the steps of:

determining whether a collation command is received from the external apparatus;

receiving identification data from the external apparatus;

collating the stored identification data with the identification data received from the external apparatus in response to a determination in said determining step that the collation command is received from the external apparatus; and disabling the data input section of the printer to disable the inputting of registration data from the external apparatus in response to a collation in said collating step that the two identification data differ from each other.

8. A computer readable storage medium according to claim 7, wherein the registration data comprises font data or form data.

9. A computer readable storage medium according to claim 7, wherein said determining step is performed in order to load the registration data from the external apparatus into a hard disc of the printer.

* * * * *